March 8, 1955  L. P. BRISSETTE ET AL  2,703,492
COMPRESSION TESTER
Filed April 19, 1952  2 Sheets-Sheet 1
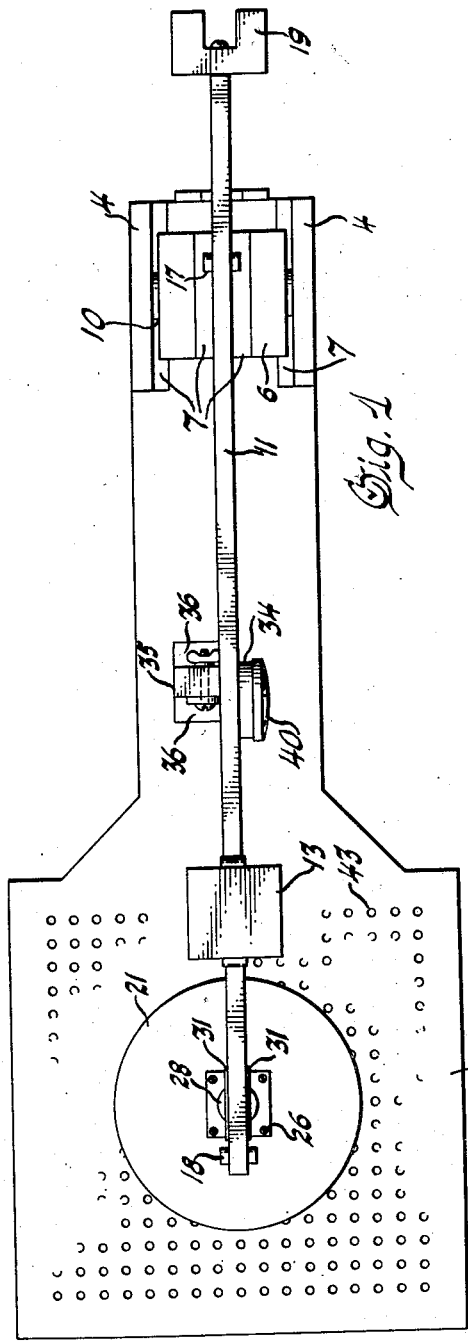
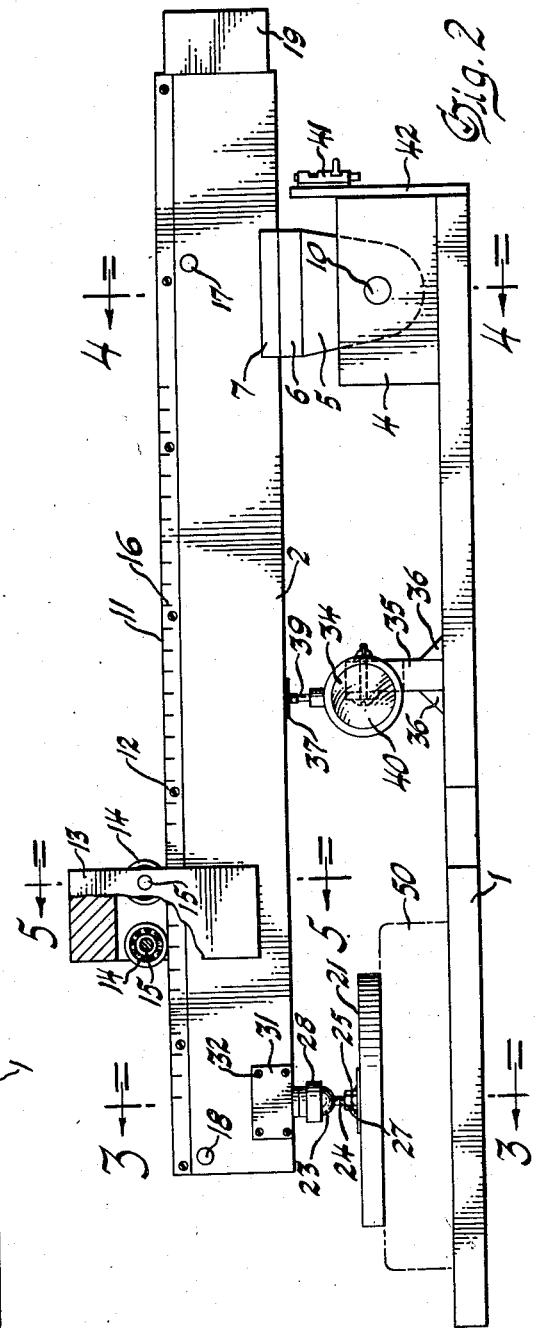
Inventor
Lawrence P. Brissette &
John G. Haviland
By Willits, Helwig & Baillio
Attorneys March 8, 1955  L. P. BRISSETTE ET AL  2,703,492
COMPRESSION TESTER Filed April 19, 1952  2 Sheets-Sheet 2

Inventor
Lawrence P. Brissette &
John G. Haviland
By Willits, Helmig & Baillie
Attorneys

# United States Patent Office 2,703,492
Patented Mar. 8, 1955

2,703,492

COMPRESSION TESTER

Lawrence P. Brissette, Detroit, and John G. Haviland, Ypsilanti, Mich., assignors to General Motors Corporation, Detroit, Mich., a corporation of Delaware Application April 19, 1952, Serial No. 283,196

4 Claims. (Cl. 73—94)

This invention relates generally to compression testing machines and, more particularly, to a new and unique compression testing machine for measuring the pressures necessary to compress foam rubber specimens of variable thicknesses and resistances certain predetermined amounts of their original thicknesses. One of the uses of this foam rubber is to make automobile seats more comfortable and therefore it is necessary to know its resistive and compressive characteristics.

The machines presently used for measuring the pressure necessary to achieve a predetermined amount of compression have been the subject of several objections, namely, that they are complex, they are heavy and therefore cannot be moved expeditiously from place to place, and they are very expensive to build.

The present machine has been developed to overcome in great part these objections by using lightweight and inexpensive material such as wood in its various forms, i. e., plywood, mahogany, etc., in a very unique manner to provide a light, simple, economical, but extremely accurate compression tester. This has been accomplished by using a pivotally supported lightweight beam having loading means acting on the beam to balance it, a pressure foot located on the beam remote from the pivotal support of the beam and over a table adapted to engage a specimen between the foot and the table, and separate means to determine the load applied to the specimen and also to determine its amount of compression on the application of such load.

Figure 3:
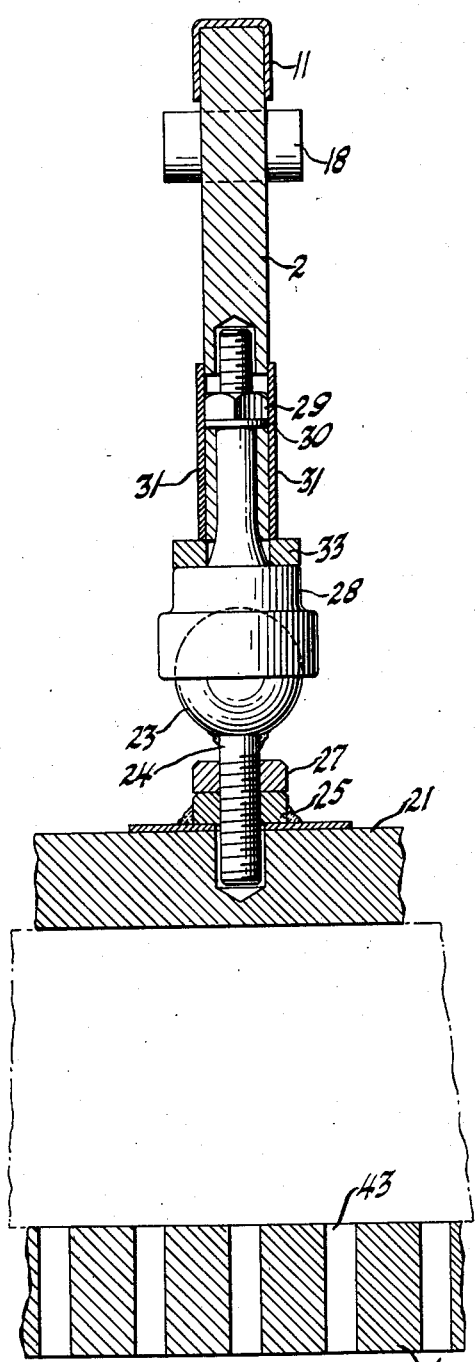
Figure 4:
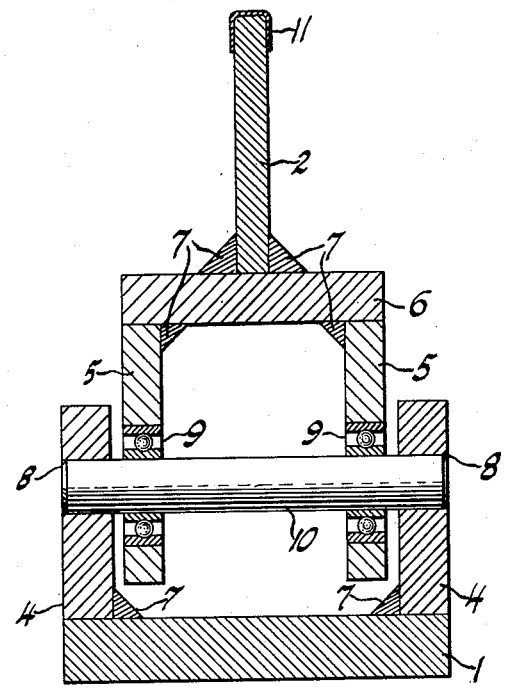
Figure 5:
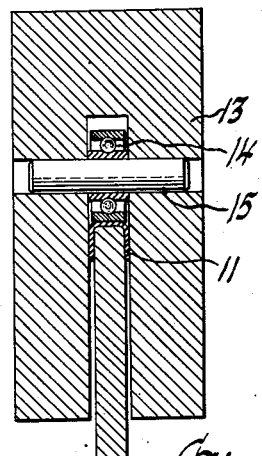

For a fuller understanding of the nature of the invention, reference may be had to the following detailed description taken in conjunction with the accompanying drawings in which:

Figure 1 is a top view of the machine;
Figure 2 is a front elevation;
Figure 3 is a sectional view taken along the line 3—3 of Figure 2;
Figure 4 is a sectional view taken along the line 4—4 of Figure 2;
Figure 5 is a sectional view taken along the line 5—5 of Figure 2.

Referring more particularly to Figures 1 and 2, the machine comprises a table 1 formed of any suitable lightweight material and in the embodiment shown is constructed of plywood. This table, when the machine is to be used, may be placed on any type of support such as another table or work bench, or even provided with legs if desired. The table 1 may be provided with perforations 43 to allow the escape of air from the specimen during a compression test.

At one end of the table 1, a beam 2 is pivotally attached by any anti-friction pivoting device which, in the preferred construction shown more particularly in Figure 4, consists of a pair of mahogany block supports 4 glued or screwed to the upper side of the table 1 at one end thereof. A second pair of mahogany block supports 5 are glued to the lower side of a flat seat 6. The lower surface of one end of the beam 2 sits on the flat seat 6 and is glued or fastened thereto by screws. To increase the strength of the various joints between the members 1 and 4, 5 and 6, and 2 and 6, suitable wooden triangular reinforcements 7 are glued thereto or fastened by screws. Each support 4 contains a drilled hole 8 and their mating supports 5 are provided with ball bearings 9. A pin 10 is inserted in the drilled holes 8 and the ball bearings 9 to complete the pivoting construction of the beam.

Referring now to Figure 2, the beam 2 is provided with a track 11 fastened to its upper surface by screws 12. An adjustable weight 13 can be rolled along the track by means of ball bearing wheels 14 rotatably mounted in the weight 13 by the pins 10. The track 11 has calibrations 16 thereon to position the weight for any predetermined load. A pre-load stop pin 17 and an end stop pin 18, each are placed at opposite ends of the beam 2 to prevent the weight 13 from rolling off the ends of the beam. The pin 17 also positions the weight 13 so as to place a predetermined load on the specimen to be tested prior to the test as will be more fully explained later in the operation of the machine. A counterweight 19 is fastened to the beam by means of a screw.

Referring to Figures 1, 2 and 3, it will be seen that on the end of the beam remote from its pivotal point is mounted a compression shoe 21 which is fastened to the beam by means of a ball and socket joint. This joint consists of the ball member 23 having a shank 24 fastened to a plate and nut assembly 25. The plate and nut assembly 25 in turn is fastened to the shoe 21 by the screws 26. A locking nut 27 holds the plate and nut assembly tightly to the shank 24 and allows a certain amount of adjustment thereon. The socket 28 is fastened to the beam 2 by a nut 29 sitting on the shelf plate 30 which is in turn held by two steel side plates 31 fastened on each side of the beam 2 with screws 32. A ring spacer 33 is placed between the lower edges of the side plates 31 and a shoulder on the upper part of the socket 28.

Located between the table 1 and the beam 2 is an indicator 34 (see Figures 1 and 2). This indicator is mounted on the upper surface of the table 1 by a mahogany support 35 and a pair of reinforcements 36. A thin metal plate 37 is fastened to the lower surface of the beam 2 by screws and engages the indicator pointer 39 to give a reading on the dial 40 for any displacement of the beam 2.

In order to transport the machine from place to place, any suitable locking means may be provided to hold the beam 2 so that it will not move relative to the table 1 thereby allowing the beam 2 to be used as a handle in said transportation. In the embodiment shown in Figure 2, a barrel bolt lock 41 is secured to a pivotal end stop 42. Pivotal end stop 42 is fastened to the end of the table.

The operation of the machine is as follows: After a specimen 50 has been placed on the table 1 and below the compression shoe 21, a pre-load may be placed on the specimen by moving the adjustable weight 13 to abut the pre-load stop pin 17. The adjustable weight 13 is then moved along the calibrated track 11 until the desired compression of the specimen is obtained as shown by the indicator 34. The position of the adjustable weight 13 is then noted and a load reading taken directly from the calibrations 16 on track 11.

To accommodate specimens of various thicknesses for testing, removable plates of different sizes (not shown) may be placed between the table and the specimen. These removable plates will properly position the compression foot and the beam to give the greatest possible accuracy.

This invention is not to be construed as limited to the specific structural details discussed herein, but is capable of other modifications without departing from the spirit and scope of the appended claims.

We claim:
1. A compression tester in combination with a table having air conducting perforations therein, including: a pivotally supported beam, a pressure foot remote from the pivotal support for said beam and over said table and attached to said beam and adapted to engage a compressible specimen placed beneath said foot and on said table over said perforations, determinable loading means reacting with said beam to displace said beam and pressure foot, and measuring means responsive to the displacement of said beam.

2. A compression tester in combination with a table having air conducting perforations therein, including: a beam pivotally mounted on said table for movement in a plane about a transverse axis perpendicular to said plane, a pressure foot attached to said beam remote from said axis and over the perforations in said table adapted to engage a compressible specimen placed beneath said foot and on said table over said perforations which prevent the containment of air between said specimen and said table, loading means acting on said beam to cause pivotal movement of said beam about said axis, and measuring means responsive to the pivotal movement of said beam about said axis.

3. A compression tester including a table, a beam positioned over said table, the top of said table having air conducting perforations therein, a pressure foot secured to said beam beneath said beam and above the perforations in said table adapted to engage a compressible specimen placed beneath said foot and on said table over said perforations which prevent the containment of air between said specimen and said table, loading means reacting with said beam and adapted to cause said foot to exert various pressures, means responsive to displacements of said beam for indicating the degree of movement between said foot and said table, pivotal means attaching one end of said beam to said table remote from said foot comprising a pair of uprights secured to the upper side of said table and along its opposite edges, a seat to which said beam is fastened, a pair of supports fastened to said seat which mate with said uprights, a pair of anti-friction bearings mounted in said supports, and a pin residing in holes in said uprights and also residing in said anti-friction bearings to pivotally secure said pair of supports to said pair of uprights.

4. A compression tester in combination with a table having air conducting perforations therein, including: a beam pivotally mounted on said table for movement in a plane about a transverse axis perpendicular to said plane, a pressure foot attached to said beam remote from said axis and over the perforations in said table adapted to engage a compressible specimen placed beneath said foot and on said table over said perforations which prevent the containment of air between said specimen and said table, loading means acting on said beam to cause pivotal movement of said beam about said axis, measuring means responsive to the pivotal movement of said beam about said axis comprising an indicator secured to the top of said table beneath said beam, and means on said indicator acted upon by said beam whereby the amount of compression of the specimen is measured.

References Cited in the file of this patent

UNITED STATES PATENTS

| Number | Name | Date |
|---|---|---|
| 1,013,046 | Murphy | Dec. 26, 1911 |
| 1,849,055 | Cropper | Mar. 15, 1932 |
| 2,156,877 | Simpson et al. | May 2, 1939 |
| 2,222,140 | De Iongh | Nov. 19, 1940 |
| 2,333,313 | Henderson | Nov. 2, 1943 |
| 2,376,814 | Robinson | May 22, 1945 |
| 2,532,947 | Russell | Dec. 5, 1950 |

FOREIGN PATENTS

| Number | Country | Date |
|---|---|---|
| 399,614 | Great Britain | Oct. 12, 1933 |